US005785840A

United States Patent [19]

Sondergeld

[11] Patent Number: 5,785,840

[45] Date of Patent: Jul. 28, 1998

[54] PROCESS FOR PRODUCING A SURFACE STRUCTURE FOR A CYLINDER OF A PRINTING MACHINE

[75] Inventor: Werner Sondergeld, Offenbach, Germany

[73] Assignee: Man Roland Druckmaschinen AG, Germany

[21] Appl. No.: 638,540

[22] Filed: Apr. 26, 1996

[30] Foreign Application Priority Data

Apr. 26, 1995 [DE] Germany ........................ 195 15 394.4

[51] Int. Cl.[6] ............................ C25F 3/02; H01R 43/00; B05D 3/00; B23K 26/06

[52] U.S. Cl. ......................... 205/640; 205/666; 205/674; 29/895.32; 219/121.73; 216/11; 216/52; 250/492.3; 427/271; 427/272; 427/274

[58] Field of Search ............................ 205/69, 640, 666, 205/649; 216/52; 156/645.1; 427/271, 272, 274, 282, 287

[56] References Cited

U.S. PATENT DOCUMENTS 4,073,710 2/1978 Visser .................................. 205/666 X 5,102,744 4/1992 Wirz et al. ............................ 205/69 X

FOREIGN PATENT DOCUMENTS 2 030 013 1/1971 Germany .

28 20 549 A1 1/1979 Germany .

40 31 860 C2 7/1992 Germany .

*Primary Examiner*—Donald R. Valentine

*Attorney, Agent, or Firm*—Leydig, Voit & Mayer, Ltd

[57] ABSTRACT

The present invention relates to a process for producing a surface structure, preferably on a cylinder, cylinder dressing, or roller of a printing machine, with a hard chromium coating which is galvanically produced and preferably ground to dimensional accuracy. The object of the invention is to develop a process which permits a surface structure to be produced on the hard chromium coating, which surface structure permits relatively high frictional forces between the contact points of the printing material and the coating of the cylinder of the printing machine. This is achieved in that the surface structure is produced in two process steps in sequence, a surface part structure being produced as a dot screen in an approximately even random distribution by means of a first material erosion process in a first process step, and the final surface structure being produced in a second process step by means of a second material erosion including the dot screen.

11 Claims, 1 Drawing Sheet

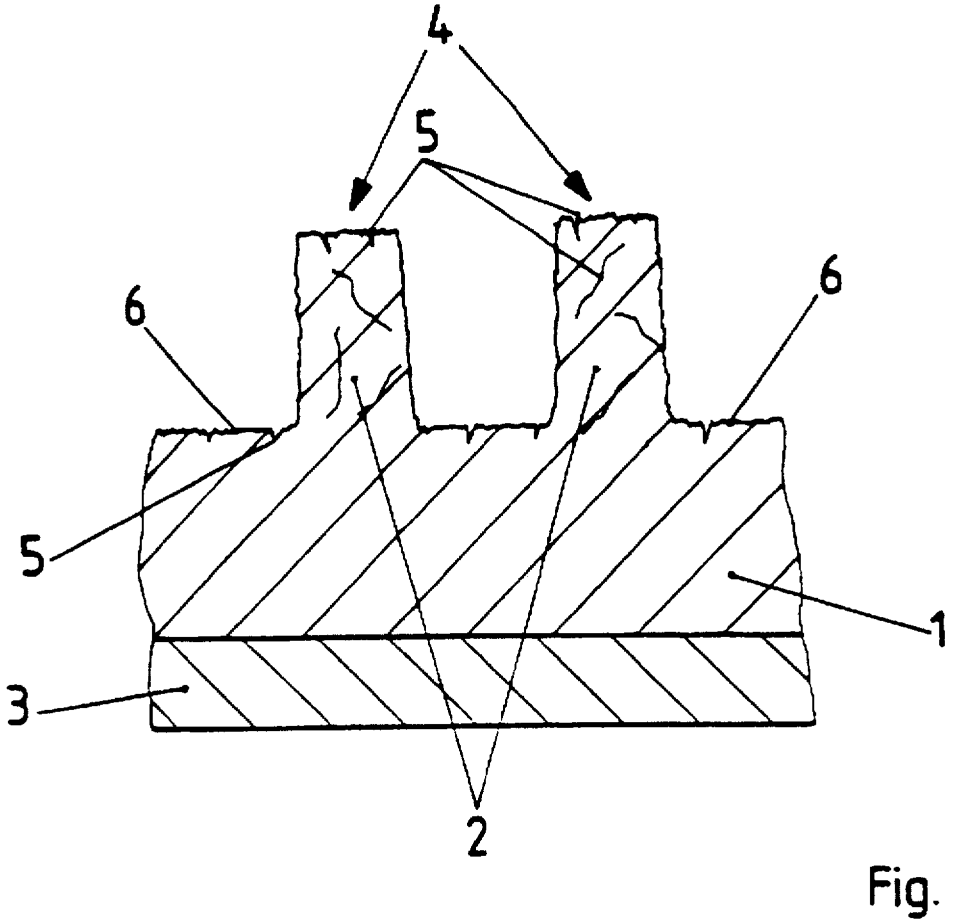
Fig.

PROCESS FOR PRODUCING A SURFACE STRUCTURE FOR A CYLINDER OF A PRINTING MACHINE

BACKGROUND OF THE INVENTION

1. Field of the Invention

The present invention relates to a process for producing a surface structure, and more particularly, to a process for producing a surface structure on a cylinder of a printing machine.

2. Discussion of the Related Art

It is known, for example, from DE-A 2,030,013 that in the galvanic production of surface structures to use an etching mask, e.g., of photosensitive resist, for etching chromium or molybdenum.

A process for producing a metal sheet conveying foil is disclosed in DE 2,820,549 A1, according to which the carrier foil is subjected to one sided blasting treatment using a metal blasting agent, and the blasted surface is subsequently nickel plated galvanically.

Furthermore, a process for producing a surface structure for printing unit cylinders in offset printing machines is disclosed in DE 4,031,860 C2. According to the disclosed process, a printing unit cylinder coated with a layer of hard chromium has a layer (photosensitive resist) applied to it, which layer is alkali-resistant after its exposure and is radiated through a screen film by means of a UV light source. The non-radiated parts of the layer are removed by means of a solvent developer, the exposed parts of the coating are etched, during which process the remaining areas of the layer are removed after etching.

The disadvantage in the process disclosed in DE 4,031,860 C2 is that the surface structure produced according to the process permits relatively small frictional forces between the coating and a printing material guided on the impression cylinder.

SUMMARY OF THE INVENTION

In accordance with one aspect, the present invention is directed to a process for producing a surface structure on a printing machine cylinder, cylinder dressing, or roller. The process comprises forming a multiplicity of elevated elements and valleys in a coating on the printing machine cylinder, cylinder dressing, or roller, the multiplicity of elevated elements are substantially the same height and randomly distributed, and forming a multiplicity of depressions in the elevated elements and valleys for increasing the roughness of the surfaces of the elevated elements and valleys.

The object of the present invention is to develop a process which permits a surface structure to be produced on a hard chromium coating of a cylinder, a foil, a dressing, or a roller of a printing machine for guiding a printing material, and which also permits relatively high frictional forces at the contact points of the printing material and the coating of the respective cylinder. Ghosting phenomena can be reduced appreciably, and the conveying of the printing material can be improved with the surface structure of the present invention.

The above object is achieved according to the present invention in that, starting from a galvanically produced hard chromium coating, preferably ground to dimensional accuracy, on a cylinder, a foil or a roller of a printing machine, the surface structure is produced in two sequential process steps.

In the first step of the process, a surface structure is produced as a dot screen with an approximately even random distribution in the hard chromium coating by means of a material erosion process. Setting out from a preferably planar hard chromium layer, the surface structure having elevated structure elements and corresponding structure valleys is developed by erosion of the chromium layer. In the second step of the process, the final surface structure is produced from the surface structure by means of a second material erosion process including the dot screen. In the second step of the process, microcracks in the chromium layer are widened.

In the present invention, the material erosion process can take place thermally, mechanically, or electrochemically in both the first and second steps of the process. In addition, the types of processing can be combined with one another, preferably, however, is that the material erosion takes place electrochemically at least in one step of the process. The microcracks present in the chromium are thus widened, i.e., enlarged, to increase the roughness thereof. By means of the two-step processing method, a surface structure is produced with bearing elements of insignificantly varying height with a preferred roughness in the range from about $R_z$ 10 to about 100 μm. An enlargement of the microcracks which are present per se in the hard chromium coating preferably takes place by means of the material erosion carried out in the second step of the process. These microcracks are particularly enlarged if the second step of the process is carried out electrochemically. In particular, in the second step of the process, an irregular network of gaps and furrows and bead-like archings, e.g., bearing elements, is achieved. Depending on the dot screen and the distribution, the archings are present as individual archings and/or as a plurality of linked (chains of) archings within the surface structure. By means of the surface structure produced in two steps, the frictional forces between the printing material and the surface structure of the hard chromium coating are increased as a result of greater roughness values. In this case, the archings bearing the printing material have an increased roughness on the preferably plateau like bearing surfaces than in the structure valleys. The bearing portions within the surface structure are changed only to a slight extent by means of the material erosion in the second process step in relation to the first process step. Only the surface roughness is increased as described. The printing material is thus guided more securely on the surface structure, for example, of a cylinder of a printing machine or a roller. The greater frictional forces bring about more precise sheet guiding and appreciably reduce possible ghosting phenomena. The irregular network of gaps, furrows, and archings and the bearing surfaces of insignificantly varying height receive printing ink from the printing material to a slight extent, which printing ink, however, is largely fed back to the printing material. Moreover, if required, the surface structure produced according to the process can be cleaned very easily. This is because the cleaning fluid and, for example, a washing brush, penetrate better into the network of widened gaps, furrows, and cracks and thus increase the cleaning effect, but also reduce the cleaning time and the consumption of cleaning fluid. In this case, the surface structure is not restricted to a hard chromium coating of a cylinder of a printing machine. In contrast, the hard chromium coating with the surface structure produced according to the process can also be a constituent part of a plate, a foil, or a dressing which is fixed in position on a cylinder of a printing machine. The surface structure produced according to the present invention can likewise be a constituent part of a roller of a machine processing printing material.

The present invention is explained in greater detail by way of an exemplary embodiment. The process according to the present invention serves for coating a cylinder of a printing machine, for example, a back pressure or impression cylinder of an offset printing machine. The cylinder of the printing machine is given a hard chromium coating in a chromium bath in a known manner. The hard chromium coating has a layer thickness of, for example, 200 μm. Subsequently, the hard chromium coating is ground to dimensional accuracy to a given layer thickness. The surface according to the invention is now produced in a two step process. In this case, the production of the surface structure in the present example takes place electrochemically by means of a material erosion process in a plant, such as is described in DE 4,031,860 C2. Correspondingly, the etching takes place by means of 10% to 20% soda lye in which the cylinder of the printing machine is connected as anode and the etching liquid is supplied in zones from an iron screen hollow cathode arranged at a slight distance from the surface of the cylinder of the printing machine. During this process, the printing unit cylinder rotates about its axis.

BRIEF DESCRIPTION OF THE DRAWING

Exemplary embodiments of the process for producing a surface structure on a cylinder of a printing machine is described below with reference to the accompanying drawing which illustrates an enlarged cross-sectional view of a surface structure with substantially cylinder shaped elements.

DETAILED DESCRIPTION OF THE PREFERRED EMBODIMENTS

In order to provide for higher quality printed images, surface structures for cylinders in printing machines are designed as printing material guiding structures. The surface structures enhance printing quality by increasing the frictional forces at the point of contact between the printing material and the particular cylinder and by reducing the retention of ink on the particular cylinder. The surface structure comprises a hard chromium layer formed into a multiplicity of elevated elements and corresponding valleys. The upper region of the elevated elements form bearing surfaces for supporting the printing material. The bearing surfaces as well as the valleys comprise depressions for increasing the roughness thereof. The surface structure may be formed on any of the cylinders of a printing machine in a two step process. In the exemplary embodiment described below, the process is described with reference to producing the surface structure on an impression or back pressure cylinder.

The FIGURE is a cross-sectional view illustrating an exemplary surface structure in accordance with the present invention. As stated above, the surface structure comprises a hard chromium layer 1 formed into a multiplicity of elevated elements 2 and corresponding valleys 6. The hard chromium layer 1 may be deposited on the surface 3 of the cylinder by any suitable means. In the exemplary embodiment, the hard chromium layer 1 is deposited on the surface 3 of the cylinder by placing the cylinder in a chromium bath. The hard chromium layer 1 deposited on the surface 3 of the cylinder is then machined to dimensional accuracy to a given layer thickness. In the exemplary embodiment, the hard chromium layer may have a thickness of about 200 μm. The surface structure may also be formed on a cylinder dressing or on a roller of the printing machine. Accordingly, in each instance the hard chromium layer 1 would be deposited on the surface thereof. Once the hard chromium layer 1 is machined to dimensional accuracy, the process of the present invention is utilized to configure the hard chromium layer 1 into a formation of statistically approximately evenly distributed elevated elements 2 and corresponding valleys 6.

In the first step of the process, the hard chromium layer 1 undergoes a material erosion process. In the material erosion process an etching mask is applied to the hard chromium layer 1 which has been deposited on the surface 3 of the impression cylinder. The etching mask is produced according to a photochemical or printing related process. Alternatively, a plastic film applied to the impression cylinder with a corresponding perforation pattern is also suitable. The etching mask, for example, an exposed layer of photosensitive resist which is subsequently developed, comprises a dot screen in a random distribution with dots of 20 to 150 μm in diameter and a center to center spacing of 50 to 200 μm. The shape of the dots may comprise any suitable configuration. Once the etching mask is in position, the hard chromium layer 1 is etched electrochemically, e.g., electrolytically. This takes place in a zone etching plant at a current density of about 300 $A/dm^2$ and a feed rate of the impression cylinder surface of about 35 mm/min and an etching intensity of 250 $Amin/dm^2$, during which process an etching depth of about 30 μm is reached. Zone etching plants are known in the art, for example, DE 4,031,860 C2 discloses a zone etching plant and its use. In the etching process described in DE 4,031,860 C2, the etching takes place by means of 10% to 20% concentration soda lye (the electrolyte) in which the cylinder is connected as an anode and the etching liquid is supplied in zones from an iron screen hollow cathode arranged at a slight distance from the surface 3 of the cylinder. During this process, the cylinder is rotated about its axis. The residues of the etching mask are subsequently removed from the hard chromium layer 1.

The first step in the process produces the multiplicity of elevated elements 2 and corresponding valleys 6 between the elevated elements 2. The elevated elements 2 may comprise any suitable structure, including cylindrical, conical, and spherical. The shape of the elevated elements 2 is determined by the particular etching mask. In the exemplary embodiment, the elevated elements 2 comprise a substantially cylindrical configuration. In addition, the multiplicity of elevated elements 2 are of substantially the same height. Both the elevated elements 2 and corresponding valleys 6 have a particular surface roughness which is increased in the second step of the process. Essentially, the surfaces of the elevated elements 2 and the valleys 6 comprise surface imperfections such as microcracks and the like which contribute to a rough surface. These microcracks are enlarged in the second step of the process to increase the roughness of the surface thereby increasing potential frictional forces.

Subsequently, in the second step of the process, a repeated electrochemical etching of the surface structure takes place at a current density ranging from about 200 to 600 $A/dm^2$ and preferably about 250 $A/dm^2$, a feed rate of the cylinder surface ranging from about 20 to 100 mm/min and preferably about 70 mm/min, and an etching intensity ranging from about 50 to about 200 $Amin/dm^2$ and preferably 100 $Amin/dm^2$. The depth of the multiplicity of elevated elements 2 and corresponding valleys 6 of the surface structure produced in the first step of the process may be reduced by about 20% in depth in the second step of the process. The surface structure achieved in the first step of the process with the etching mask in the form of a dot screen and having substantially column shaped or cylindrical elevated elements 2 becomes a surface structure of an irregular network of gaps, furrows, and archings 5, i.e., depressions, by means of the material erosion, i.e., etching, in the second step of the process. The network of gaps, furrows, and archings 5 act as bearing surfaces 4 for the printing material. The bearing surfaces 4 have a surface roughness in the range from about $R_z$ 10 to about 100 μm, and preferably of about $R_z$ 25 μm. The irregular network of gaps, furrows, and archings 5 forms a specific microroughness which guarantees a balanced and evenly distributed reception of ink on the surface structure. At the same time, the surface structure feeds substantially all of the ink back to the printing material. The network of gaps, furrows, and archings 5 also extends over the surfaces of the valleys 6 between the elevated elements 2. The gaps, furrows, and archings 5 are formed at a depth within the hard chromium layer 1 such that a sufficient hard chromium layer 1 preventing any potential corrosion still remains on the cylinder, the dressing, or the roller of the printing machine. Any potential entry of moisture or cleaning fluid through the gaps, furrows, and archings 5 is thus prevented.

Instead of the electrochemical procedure described above, the material erosion can also be carried out mechanically. However, in one of the two process steps, the material erosion preferably is implemented electrochemically. The electrochemical procedure in one of the two process steps is required to produce the irregular network of gaps, furrows, and archings since the desired surface roughness will not otherwise be achieved. The material erosion can be carried out mechanically, for example, by means of a blasting medium, e.g., with a hard blasting medium such as corundum.

As an alternative, the material erosion can likewise be produced thermally by means of a laser or an electron beam. Again, this is possible in the first or second steps of the process if, the material erosion takes place electrochemically in one step of the process for the reasons described above.

Although shown and described are what is believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A process for producing a surface structure on a printing machine cylinder, cylinder dressing, or roller, the process comprising the steps of:

forming a multiplicity of elevated elements and valleys in a coating on the printing machine cylinder, cylinder dressing, or roller, the multiplicity of elevated elements being substantially the same height and randomly distributed; and forming a multiplicity of depressions in the elevated elements and valleys for increasing the roughness of the surfaces of the elevated elements and valleys.

2. The process for producing a surface structure according to claim 1, wherein the step of forming a multiplicity of elevated elements and valleys comprises a material erosion process.

3. The process for producing a surface structure according to claim 2, wherein the material erosion process comprises an electrochemical etching process.

4. The process for producing a surface structure according to claim 3, wherein the electrochemical etching process includes positioning a dot screen mask having a random distribution of dots on the coating of the printing machine cylinder, cylinder dressing, or roller, the dots having a diameter in the range from 20 to 150 μm and a center to center spacing of 50 to 200 μm.

5. The process for producing a surface structure according to claim 4, wherein the electrochemical etching process comprises electrolytical etching at a current density of about 300 A/dm$^2$, an etching intensity of about 250 Amin/dm$^2$, and a feed rate of about 35 mm/min using a 10 to 20 percent soda lye solution.

6. The process for producing a surface structure according to claim 2, wherein the material erosion process comprises a mechanical erosion process.

7. The process for producing a surface structure according to claim 1, wherein the step of forming a multiplicity of depressions comprises a material erosion process.

8. The process for producing a surface structure according to claim 7, wherein the material erosion process comprises an electrochemical etching process.

9. The process for producing a surface structure according to claim 8, wherein the electrochemical etching process comprises electrolytical etching at a current density ranging from about 200 to 600 A/dm$^2$, an etching intensity ranging from about 50 to about 200 Amin/dm$^2$, and a feed rate ranging from about 20 to 100 mm/min using a 10 to 20 percent soda lye solution.

10. The process for producing a surface structure according to claim 7, wherein the material erosion process comprises a thermal erosion process.

11. The process for producing a surface structure according to claim 1, wherein the coating comprises a chromium layer deposited on the surface of the printing machine cylinder, cylinder dressing, or roller and machined to dimensional accuracy.

* * * * *